United States Patent [19]
Ribouleau

[11] 3,901,169
[45] Aug. 26, 1975

[54] SOWING MACHINE, IN PARTICULAR FOR CORN OR BEET SEEDS

[76] Inventor: Edmond André Henri Ribouleau, 79 Largeasse, France

[22] Filed: Jan. 22, 1974

[21] Appl. No.: 435,523

[30] Foreign Application Priority Data
Jan. 22, 1973 France .................. 73.02075

[52] U.S. Cl. .................. 111/52; 172/307; 172/484
[51] Int. Cl.² .......................................... A01C 5/00
[58] Field of Search ........ 111/52, 85; 172/484, 444, 172/307

[56] References Cited
UNITED STATES PATENTS

| | | | |
|---|---|---|---|
| 2,674,170 | 4/1954 | Morkoski | 172/307 |
| 2,729,156 | 1/1956 | Willey | 172/444 |
| 3,327,786 | 6/1967 | Meyer | 172/307 X |
| 3,797,418 | 3/1974 | Bridger | 111/85 X |

Primary Examiner—Stephen C. Pellegrino
Attorney, Agent, or Firm—Eric P. Schellin

[57] ABSTRACT

The sowing machine has a chassis including in the front of the chassis a detachable extension which carries an auxiliary support wheel. The chassis is connected to the mounting bar of the tractor by means of an articulated device comprising a lower link and an upper link which comprises two telescopically interconnected elements. When the two elements are relatively freely slidable, the sowing machine is adapted to distribute beet seeds. When the auxiliary wheel is withdrawn and the two elements are interlocked by means of a pin extending therethrough, the two elements of the upper link form with the lower link an articulated parallelogram system and the sowing machine is then adapted to distribute corn seeds.

10 Claims, 5 Drawing Figures

PATENTED AUG 26 1975　　　3,901,169
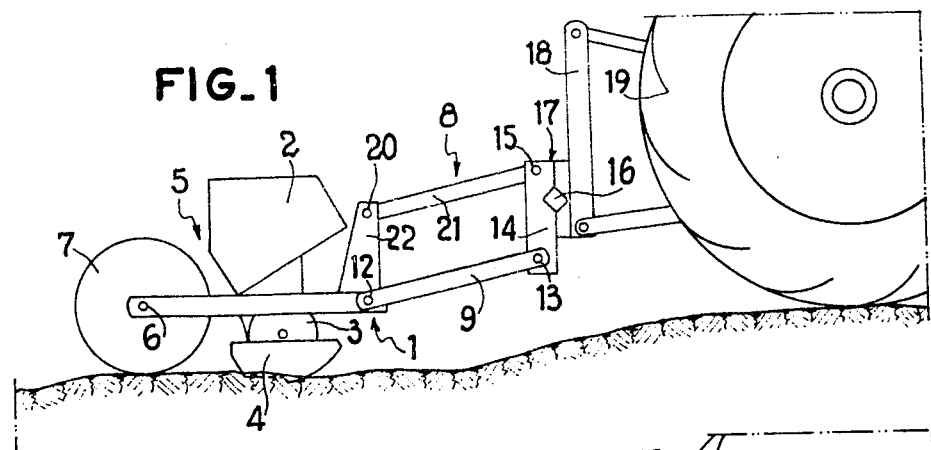
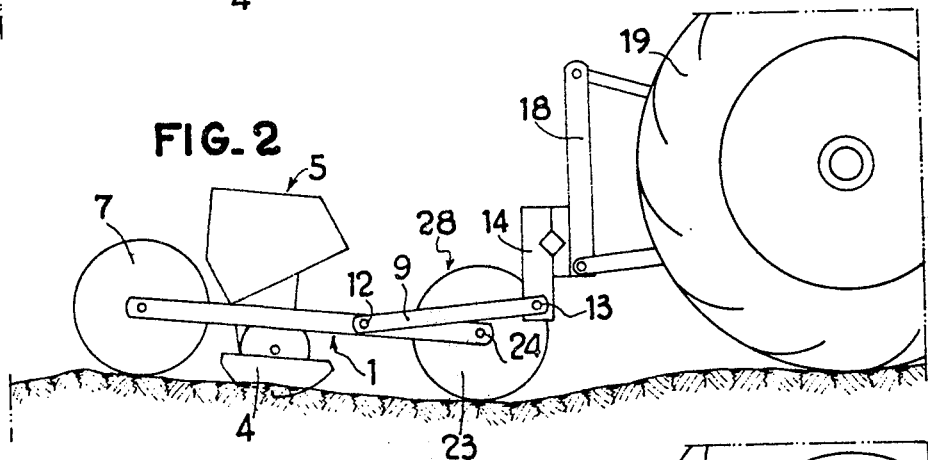
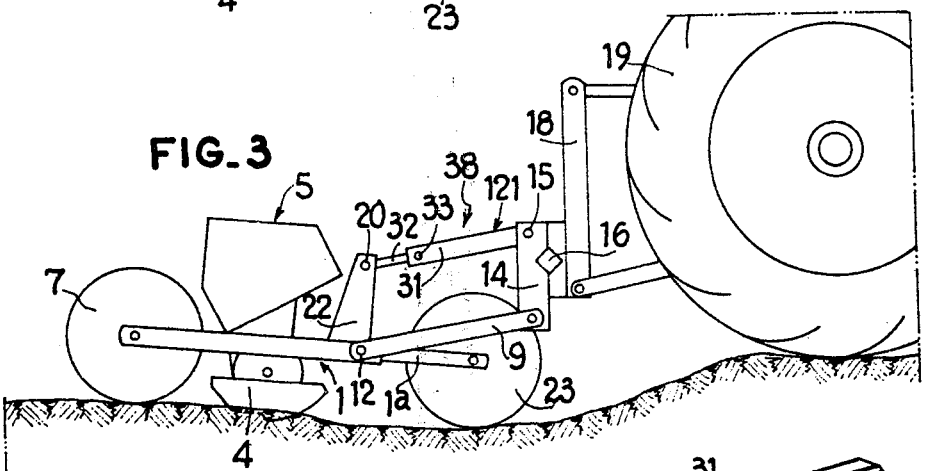
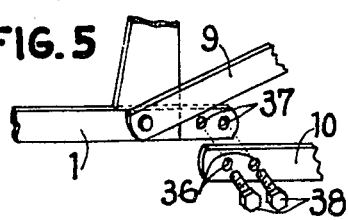
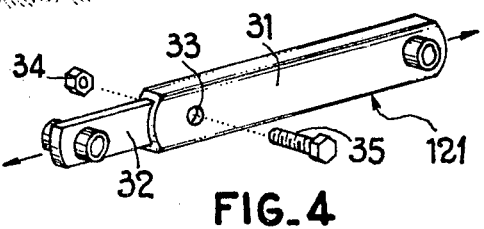

SOWING MACHINE, IN PARTICULAR FOR CORN OR BEET SEEDS

The present invention relates to sowing machines comprising a seed distributor carried by a chassis which is provided at the rear with at least one support wheel and to which there is pivoted a connecting device which is pivoted to a support adapted to be fixed to the mounting bar of a tool holder disposed at the rear of a tractor.

In known sowing machines, the chassis and its connecting device are arranged in a different manner depending on whether the sowing machine is employed for sowing maize or corn seeds or beet seeds.

In the equipment provided for maize or corn seeds, the pressure exerted on the ground must be relatively high so that the ground is to a certain extent packed after the burying of the seeds. For this purpose, there is provided at the rear of the chassis a single support wheel, or a pair of support wheels, and the connecting device forms in the front of the chassis an articulated parallelogram system comprising a lower link having a double arm and an upper link having a single arm. The support wheel then supports the major part of the weight of the sowing machine and, owing to the effect of the articulated parallelogram system, the whole of the sowing machine, including the ploughshare which makes a furrow in the ground before the burying of the seeds, follows the unevenness of the ground independently of the support adapted to be fixed to the tool holder bar.

In the equipment provided for beet seeds, the pressure on the ground must be low so that the earth does not undergo any packing. The front of the chassis is then provided with an additional wheel, or a pair of wheels, and the connecting device is constituted merely by a link formed by a double traction arm which is pivoted at its front end to the support adapted to be fixed to the tool holder bar. The weight of the sowing machine is in this way distributed over two wheels, or two sets of wheels, and, as in the foregoing case, the sowing machine follows the unevenness of the ground independently of the support.

An object of the present invention is to provide a sowing machine which is equipped for the distribution of maize or corn seeds, that is to say, comprises a seed distributor carried by a chassis which has at the rear at least one support wheel and to which there is pivoted a connecting device which comprises a lower link formed by two arms and an upper arm arranged in such manner that the sowing machine is very easily convertible for the distribution of beet seeds.

The invention provides a sowing machine, wherein the front end of the chassis is adapted for the detachable mounting of at least one auxiliary support wheel and the upper arm of the connecting device is formed by two elements which are slidably interengaged and which may be either locked with respect to each other so as to constitute an upper link which forms, together with the lower link, an articulated parallelogram system, or free to slide with respect to each other so that the auxiliary wheel, when mounted at the front of the chassis, constantly bears on the ground and the traction connection between the chassis and the support is ensured exclusively by the lower link.

When the two elements are locked, for example by means of a bolt and a nut, so as to form the upper link of an articulated parallelogram system and the front of the chassis is devoid of an auxiliary wheel, the sowing machine behaves in exactly the same way as known sowing machines for maize seeds. On the other hand, if an auxiliary wheel is mounted at the front of the chassis and the locking bolt is withdrawn, the upper link is disconnected and rendered inoperative and the sowing machine can be used for distributing beet seeds, the auxiliary wheel at the front of the chassis bearing on the ground.

The two elements may be interlocked by a pin, a bolt or the like.

Further features and advantages of the invention will be apparent from the ensuing description with reference to the accompanying drawing.

In the drawing:

FIG. 1 is a diagrammatic view of a known sowing machine for distributing maize or corn seeds;

FIG. 2 is a diagrammatic view of a known sowing machine for the distribution of beet seeds;

FIG. 3 is a diagrammatic view of a sowing machine according to the invention;

FIG. 4 is a perspective view of the two elements constituting the upper arm of the connecting device of the sowing machine shown in FIG. 3, and FIG. 5 is a view of a detail showing the detachable assembly of a chassis extension for mounting an auxiliary wheel.

The maize or corn seeds sowing machine shown in FIG. 1 is of conventional construction and comprises a chassis 1 supporting a hopper 2 filled with seeds and supplying the seeds to a distributor wheel 3 which disposes the seeds one by one in a furrow opened by a ploughshare 4. The rear end of the chassis 1 is provided with a shaft 6 on which a support wheel 7 is freely rotatable and there is pivoted to its front end a connecting device 8 which forms an articulated parallelogram system whose lower link 9 is formed by a double arm pivoted at 12 to the side members of the chassis and at 13 to a support 14 fixed to the mounting bar 16 of a tool holder 17 carried by the raising system 18 of the tractor 19, the upper link 21 of the parallelogram system being constituted by a single arm pivoted at 20 to an upright 22 of the chassis and at 15 to the support 14.

In the beet seeds sowing machine shown in FIG. 2, which is also of conventional construction, the chassis has at its front end an auxiliary support wheel 23 mounted on a shaft 24 and the connecting device 28 is limited to the traction link 9 whose pivotal connection 12 to the chassis 1 is located between the distributor device 5 and the auxiliary wheel 23.

In the sowing machine according to the invention shown in FIG. 3 which comprises, in the same way as the sowing machine shown in FIGS. 1 and 2, a rear support wheel 7 and a distributor device 5, the chassis 1 may be provided with a detachable rigid extension 1a whose front end carries a shaft 24 on which there is mounted an auxiliary support wheel 23 in the same way as in the arrangement shown in FIG. 2. As concerns the connecting device 38, it is arranged in the same way as the device 8 shown in FIG. 1 with a pivoted upper arm but this upper arm 121 comprises two elements 31 and 32 which are assembled telescopically, the member 31 being a slide having flat faces pivoted at one end at 15 to the support 14. In the other end of the slide 31 there is slidably fitted the other element 32 formed by a flat bar pivoted at 20 to the upright 22 of the chassis 1. Coinciding apertures 33 formed in the slide 31 and in the bar 32 are provided for receiving a locking bolt 35 which is adapted to lock, by means of a nut 34, the two elements in such relative position that these two elements constitute a rigid arm which is equivalent to the link 21 shown in FIG. 1 and defines together with the lower link 9 an articulated parallelogram system.

When the bolt 35 is withdrawn, as shown in FIG. 3, the two elements 31 and 32 are freely slidable with respect to each other and perform no function in the connecting device 38 which, from the operating point of view, is limited to the lower traction link 9. The presence of the auxiliary support wheel 23, carried by the extension 1a, then imparts to the sowing machine characteristics which are those of the structure shown in FIG. 2 and the machine is therefore adapted for the distribution of beet seeds.

On the other hand, when the two elements 31 and 32 are interlocked in the relative position defined hereinbefore by means of the bolt 35 and the nut 34 and the extension 1a of the chassis which carries the auxiliary wheel 23 is withdrawn, the sowing machine is converted into a version which is the equivalent of the maize seeds sowing machine shown in FIG. 1.

FIG. 5 shows, as an example of the assembly of the detachable extension 1a with the chassis 1, a method employing bolts 38 which extend through coinciding apertures 36 and 37 provided respectively in the extension 1a and at the end of the chassis 1. It will be understood that other means for separably interconnecting the chassis and extension 1a may also be employed.

It will be understood that the upper arm 121 could be constructed in forms different to that shown in FIG. 4. Thus the element 31 could be a round tube or a square tube which receives telescopically an element 32 constituted respectively by a round bar or a square-section bar. The two elements 31 and 32 could also be in the form of two flat juxtaposed strips which are relatively slidable owing to the provision of one or more lug and slot guiding arrangements.

Having now described my invention, what I claim as new and desire to secure by Letters Patent is:

1. A sowing machine comprising a chassis, at least one first support wheel carried by the chassis at the rear of the chassis, a seed distributor carried by the chassis, a support for fixing to the rear of a tractor, a connecting device for interconnecting the chassis and support and comprising a lower link and an upper arm which have first end portions pivoted to the chassis by two spaced apart pivots and second end portions pivoted to the support by two spaced apart pivots, the chassis having a front end part, at least one auxiliary support wheel, means for detachably mounting the auxiliary support wheel on said front end part, the upper arm of the connecting device comprising two elements which are relatively slidably interengaged, releasable means for interlocking the two interengaged elements so as to constitute an upper link of fixed length which forms, together with the lower link and said four pivots on the chassis and support, an articulated parallelogram system, said releasable means being capable of allowing said interengaged elements to slide with respect to each other and rendering the upper arm completely inoperative when the releasable means are released so that the chassis is no longer constrained to maintain a constant angle relative to said support and the auxiliary wheel, when mounted in said front part of the chassis, constantly bears on the ground and determines, in cooperation with said first support wheel, the angle of the chassis relative to the ground, the connection between said chassis and said support as concerns the drawing of said chassis by said support being ensured exclusively by said lower link.

2. A sowing machine as claimed in claim 1, wherein said means for detachably mounting the auxiliary support wheel comprise an extension carrying the auxiliary support wheel and means for detachably mounting the extension on said front part of the chassis.

3. A sowing machine as claimed in claim 1, wherein said means for detachably mounting the auxiliary support wheel mounts the auxiliary support wheel directly on said front part of the chassis.

4. A sowing machine as claimed in claim 1, wherein the two interengaged elements constituting the upper arm are telescopically interconnected.

5. A sowing machine as claimed in claim 4, wherein one of said interengaged elements is a slide and the other of said interengaged elements is a bar which is slidably fitted in said slide.

6. A sowing machine as claimed in claim 5, wherein the slide has a rectangular cross-sectional shape and the bar is a flat strip.

7. A sowing machine as claimed in claim 1, wherein said means for interlocking said interengaged elements comprise a locking member and means defining coinciding apertures in the two interengaged elements through which apertures said locking member extends.

8. A sowing machine as claimed in claim 1, wherein said means for interlocking said two interengaged elements comprise a bolt and nut, and means defining coinciding apertures in the two interengaged elements, the bolt extending through said apertures.

9. A sowing machine as claimed in claim 2, wherein said means for detachably mounting the extension on said front part of the chassis comprise bolts and means defining coinciding apertures in the extension and said front part of the chassis, the bolt extending through said apertures.

10. A sowing machine comprising a chassis, a seed distributor carried by the chassis, first support wheel means carried by the chassis on a first side of the distributor, auxiliary support wheel means, means for detachably mounting the auxiliary support wheel means on the chassis on a second side of the distributor opposed to said first side, a support for fixing to a tractor, an articulated four-sided substantially parallelogram device for connecting the chassis to the support when said auxiliary wheel means are detached from the chassis so that the chassis is movably connected to the support but whose angle relative to the support is determined by said articulated device comprising two links extending longitudinally of the chassis and constituting two of said sides, releasable means for rendering three of said sides of the articulated device inoperative when the releasable means are released so that only one of said links connects the chassis to the support for drawing the chassis along the ground whereby when said auxiliary wheel means are mounted on the chassis the angle of the chassis relative to the support is determined solely by said first wheel means and said auxiliary wheel means bearing on the ground.

* * * * *